United States Patent
Ohguro et al.

(10) Patent No.: US 9,542,136 B2
(45) Date of Patent: Jan. 10, 2017

(54) COMMUNICATION CONTROL SYSTEM, COMMUNICATION CONTROL APPARATUS, AND COMMUNICATION CONTROL METHOD

(71) Applicants: Yoshihisa Ohguro, Kanagawa (JP); Tomofumi Harada, Kanagawa (JP)

(72) Inventors: Yoshihisa Ohguro, Kanagawa (JP); Tomofumi Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/066,702

(22) Filed: Mar. 10, 2016

(65) Prior Publication Data
US 2016/0274839 A1 Sep. 22, 2016

(30) Foreign Application Priority Data

Mar. 19, 2015 (JP) .................................. 2015-056715
Feb. 1, 2016 (JP) .................................. 2016-017401

(51) Int. Cl.
*G06F 15/00* (2006.01)
*G06K 1/00* (2006.01)
(Continued)

(52) U.S. Cl.
CPC .......... *G06F 3/1238* (2013.01); *G06F 3/1222* (2013.01); *G06F 3/1236* (2013.01); *G06F 3/1288* (2013.01); *G06F 3/1292* (2013.01); *H04W 12/06* (2013.01)

(58) Field of Classification Search
CPC .... G06F 3/1238; G06F 3/1222; G06F 3/1236; G06F 3/1292; G06F 3/1288; H04W 12/06
(Continued)

(56) References Cited

U.S. PATENT DOCUMENTS

2006/0281441 A1* 12/2006 Okochi .............. G06Q 30/0225
455/411
2012/0066213 A1 3/2012 Ohguro
(Continued)

FOREIGN PATENT DOCUMENTS

JP 2002-247052 8/2002
JP 2003-216581 7/2003
(Continued)

*Primary Examiner* — Douglas Tran
(74) *Attorney, Agent, or Firm* — Oblon, McClelland, Maier & Neustadt, L.L.P.

(57) ABSTRACT

A communication control system includes an attendance confirmation accepting unit that accepts confirmation of attendance according to an operation of an attendee to an information processing apparatus located at a conference room, a random number processor that generates a random number in case of accepting the confirmation of attendance and stores connection authentication information based on the random number in a memory, the connection authentication information being used for authenticating exchange of information with a terminal operated by the attendee at the conference, a print controller that transfers an output command for printing an image having the generated random number to an image forming apparatus, and a wireless connection controller that receives authentication information input by the terminal based on the random number via wireless communication at the conference room and authenticates the exchange of information with the terminal based on the connection authentication information stored in the memory.

9 Claims, 21 Drawing Sheets

(51) Int. Cl.
*G06K 15/00* (2006.01)
*G06F 3/12* (2006.01)
*H04W 12/06* (2009.01)

(58) Field of Classification Search
USPC .................................. 358/1.1, 1.14, 1.15
See application file for complete search history.

(56) References Cited

U.S. PATENT DOCUMENTS

| | | |
|---|---|---|
| 2012/0240023 A1 | 9/2012 | Ohguro |
| 2013/0332739 A1* | 12/2013 | Yi .......................... H04L 9/0841 713/171 |
| 2014/0013220 A1 | 1/2014 | Ohguro |
| 2014/0093170 A1 | 4/2014 | Ohguro |
| 2014/0268246 A1 | 9/2014 | Ohguro |
| 2015/0261735 A1 | 9/2015 | Ohguro |

FOREIGN PATENT DOCUMENTS

| | | |
|---|---|---|
| JP | 2006-039679 | 2/2006 |
| JP | 2012-018570 | 1/2012 |

* cited by examiner

FIG. 4

CONFERENCE ID

USER ID

PASSWORD

| CONFERENCE ID | USER ID | PASSWORD |  |
|---|---|---|---|
| meeting001 | userXXX | xxxxxxxx | |
| meeting002 | userXXX | xxxxxxxx | . . . |
| meeting003 | userXXX | xxxxxxxx | |
| meeting004 | userXXX | xxxxxxxx | |
| . . . | | | |

FIG. 6

SCREEN FOR CONFIRMING ATTENDANCE AT CONFERENCE

CONFERENCE ID [▼]

USER ID [ ]

PASSWORD [ ]

[OK] [CANCEL]

FIG. 7

|   | A | B | C | D | E | F | G | H | I | J |
|---|---|---|---|---|---|---|---|---|---|---|
| 1 | 1 | F | 3 | K | 3 | 4 | D | 5 | 4 | 9 |
| 2 | M | 2 | 5 | 3 | R | 2 | 8 | 4 | M | 3 |
| 3 | 4 | E | 9 | 1 | K | 6 | 2 | Y | 0 | 7 |
| 4 | C | 5 | 2 | T | 8 | 5 | L | 1 | 7 | C |
| 5 | 6 | S | 6 | 8 | E | 7 | 4 | A | 8 | 0 |

FIG. 8

CONFERENCE ID
USER ID
PASSWORD

| CONFERENCE ID | USER ID | PASSWORD | SPECIFICATION OF CELL |
|---|---|---|---|
| meeting001 | userXXX | xxxxxxxx | A-3, F-2, C-5 |
| meeting002 | userXXX | xxxxxxxx | B-2, D-1, H-4 |
| meeting003 | userXXX | xxxxxxxx | C-1, G-2, I-3 |
| meeting004 | userXXX | xxxxxxxx | B-5, E-3, J-2 |

SCREEN FOR INPUTTING CONNECTION AUTHENTICATION INFORMATION

USER ID

PASSWORD

INPUT RANDOM NUMBERS

OK    CANCEL

INFORMATION ON
CONNECTION ALLOWANCE

USER ID

MAC ADDRESS

IP ADDRESS

DATE OF ALLOWANCE

. . .

| CONFERENCE ID | USER ID | PASSWORD | CONFIRMATION OF ATTENDANCE | |
|---|---|---|---|---|
| meeting001 | userXXX | xxxxxxxx | CONFIRMED | |
| meeting002 | userXXX | xxxxxxxx | NOT YET | |
| meeting003 | userXXX | xxxxxxxx | NOT YET | . . . |
| meeting004 | userXXX | xxxxxxxx | CONFIRMED | |
| . . . | | | | |

FIG. 27

| USER ID | PASSWORD | CONFERENCE ID |
|---------|----------|---------------|
| userXX1 | xxxxxxxx | A3F2C5 |
| userXX2 | xxxxxxxx | A3F2C5 |
| userXX3 | xxxxxxxx | A3F2C5 |
| userXX4 | xxxxxxxx | A3F2C5 |

| USER ID | PASSWORD | CONFERENCE ID |
|---------|----------|---------------|
| userXX1 | xxxxxxxx | A3F2C5 |
| userXX2 | xxxxxxxx | B2D1H4 |
| userXX3 | xxxxxxxx | C1G2I3 |
| userXX4 | xxxxxxxx | B5E3J2 |

SCREEN FOR INPUTTING CONNECTION AUTHENTICATION INFORMATION

USER ID [ ]

PASSWORD [ ]

CONFERENCE ID [ ]

[ OK ]   [ CANCEL ]

COMMUNICATION CONTROL SYSTEM, COMMUNICATION CONTROL APPARATUS, AND COMMUNICATION CONTROL METHOD

CROSS-REFERENCE TO RELATED APPLICATIONS

This patent application is based on and claims priority pursuant to 35 U.S.C. §119(a) to Japanese Patent Application Nos. 2015-056715, filed on Mar. 19, 2015 and 2016-017401, filed on Feb. 1, 2016 in the Japan Patent Office, the entire disclosures of which are hereby incorporated by reference herein.

BACKGROUND

Technical Field

The present invention relates to a communication control system, a communication control apparatus, and a communication control method.

Background Art

Recently, information can be exchanged within limited areas using close-range wireless communication technologies such as Wireless Fidelity (Wi-Fi) and Near Field Communication (NFC). In those technologies, various methods that can allow to exchange information among limited terminals only have been proposed. For example, a technology that forms a network in which information can be exchanged among terminals to which a same keyword is input has been proposed.

SUMMARY

Embodiments of the present invention provide a novel communication control system that includes an attendance confirmation accepting unit that accepts confirmation of attendance according to an operation of an attendee to an information processing apparatus located at a conference room, a random number processor that generates a random number in case of accepting the confirmation of attendance and stores connection authentication information based on the random number in a storage medium, the connection authentication information being used for authenticating exchange of information with a terminal operated by the attendee at the conference, a print controller that transfers an output command for printing an image having the generated random number to an image forming apparatus, and a wireless connection controller that receives authentication information input by the terminal based on the random number via wireless communication at the conference room and authenticates the exchange of information with the terminal based on the connection authentication information stored in the storage medium.

Further embodiments of the present invention provide a communication control apparatus and a communication control method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 4 is a diagram illustrating information included in a request to register attendance as an embodiment of the present invention.

FIG. 5 is a diagram illustrating information on accepting a request for attendance as an embodiment of the present invention.

FIG. 6 is a diagram illustrating a graphic user interface (GUI) of a screen for confirming attendance at a conference as an embodiment of the present invention.

FIG. 7 is a diagram illustrating a random table as an embodiment of the present invention.

FIG. 8 is a diagram illustrating information on connection authentication as an embodiment of the present invention.

FIG. 9 is a diagram illustrating another information on accepting a request for attendance as an embodiment of the present invention.

FIG. 10 is a diagram illustrating a GUI of a screen for inputting information on connection authentication as an embodiment of the present invention.

FIG. 27 is a diagram illustrating information on connection authentication as the other embodiment of the present invention.

FIG. 28 is a diagram illustrating another information on connection authentication as the other embodiment of the present invention.

FIG. 29 is a diagram illustrating a GUI of a screen for inputting information on connection authentication as the other embodiment of the present invention.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In the known technology, it is possible to establish a network only available among intended terminals easily. However, the network is still a simple one, and the network is not compatible with advanced information security. In communication such as wireless communication that a physical connection is not required, it is possible that undesirable users might be allowed to connect due to a leak of a keyword etc. described before.

As an example of the wireless communication network, a network for distributing materials to attendees at a conference room with multiple attendees can be considered. Especially, in highly confidential conferences, since advanced security is required in distributing materials, it is required to reject unauthorized accesses by spoofing.

To cope with this issue, it is possible to prevent unauthorized accesses by spoofing using advanced user authentication together. However, it is required to use and control devices compatible with the advanced user authentication to implement that scheme. Especially, if the advanced user authentication such as fingerprint authentication is adopted to the user terminal, it could be a problem that only limited users can use that terminal.

In the embodiment described below, a communication control system in a conference room that can achieve advanced security in exchanging information using wireless communication with a simple configuration is provided.

Embodiment 1

In this embodiment, a conference system that can manage attendance at a conference and distribute materials to attendees in a conference room is described as an example. In those systems, it is possible to maintain advanced information security in this embodiment.

Figure 1:
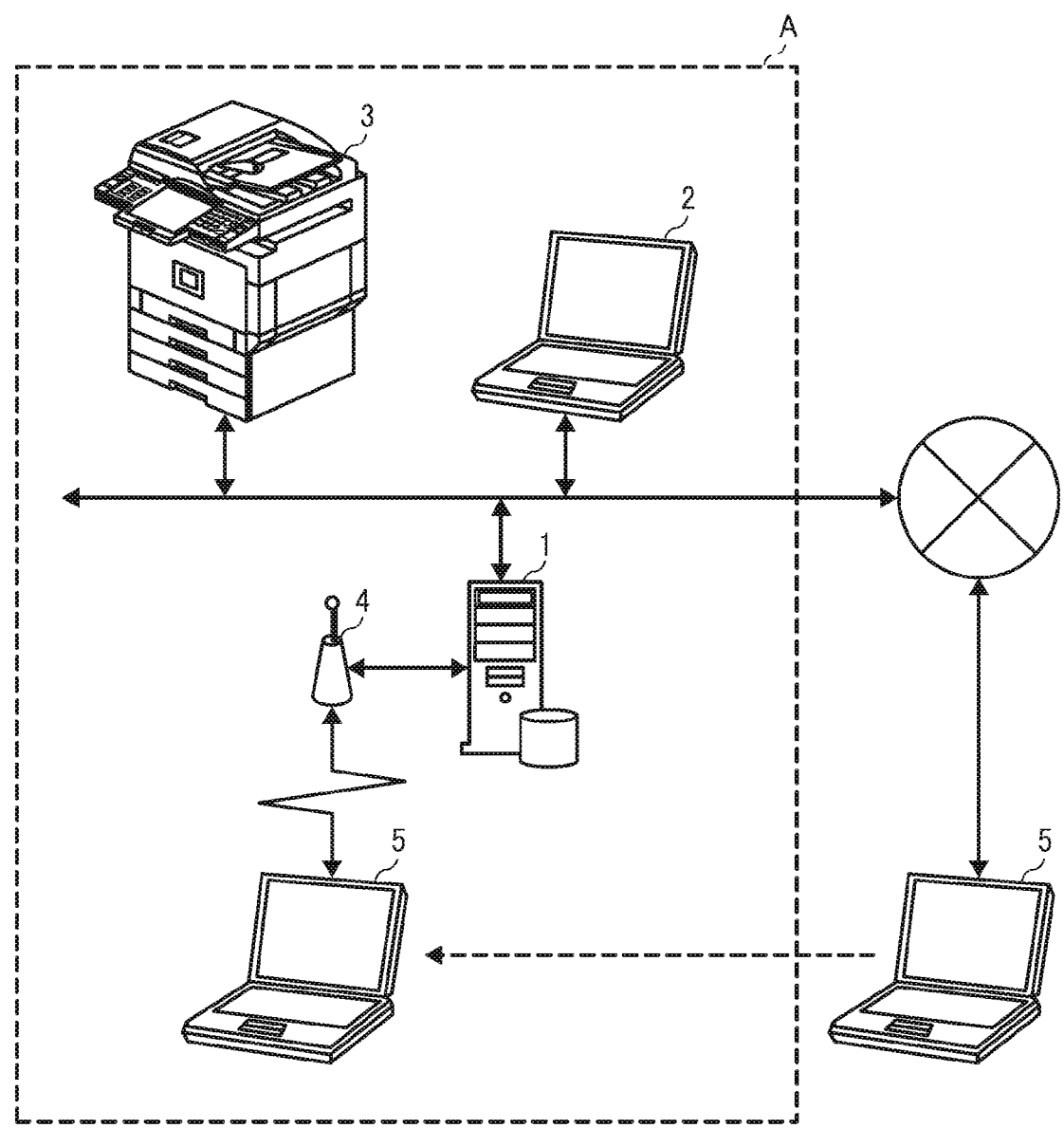
FIG. 1 is a diagram illustrating a system as an embodiment of the present invention.

FIG. 1 is a diagram illustrating a conference system in this embodiment. As shown in FIG. 1, the conference system in this embodiment includes a conference system server 1, an attendance management terminal 2, an image forming apparatus 3, and an access point 4. A user utilizes the conference system by using a user terminal 5.

In FIG. 1, a configuration surrounded by broken lines A is contained in a conference room. A system server 1, an attendance management terminal 2, an image forming apparatus 3, and an access point 4 contained in the conference room are connected with each other via a network such as intranet established within a limited area.

A user registers himself/herself preliminarily using the user terminal 5 via a network channel such as the Internet. Subsequently, after arriving at the conference room, the user connects the user terminal 5 to the system via the access point 4 to receive the conference material. In this embodiment, it is possible to enhance security in the network connection via the access point 4.

The conference system server 1 is a server that provides various functions of the conference system in this embodiment. One of the functions is to distribute the conference materials. That is, the conference system server 1 functions as a material distribution apparatus. In addition, the conference system server 1 in this embodiment provides a function that controls accesses from/to a terminal that establishes wireless connection with the access point 4. That is, the system in this embodiment also functions as a communication control system, and the conference system server 1 functions as a communication control apparatus. Those functions are described in detail later.

The attendance management terminal 2 is an information processing terminal that registers attendance at the conference by inputting authentication information at the conference room by user operation. For example, the attendance management terminal 2 can be implemented by using a generic information processing terminal such as a personal computer (PC) etc.

The image forming apparatus 3 prints out a random table used by the user who registered his/her attendance at the conference on the attendance management terminal 2 required for receiving distribution of the conference materials by accessing the system using the user terminal 5. The conference system server 1 inputs a print job as an output command to instruct the image forming apparatus 3 to print out the random table. The access point 4 is a wireless communication apparatus that provides wireless communication connection to the user terminal 5. For example, the access point 4 is implemented by using a wireless LAN router.

The user terminal 5 is an information processing terminal held by the system user, and the user terminal 5 is implemented by using portable information processing apparatuses such as a notebook PC, a tablet device, and a smartphone etc. As shown in FIG. 1, after accessing the system via the network such as the Internet etc., the attendance at the conference is registered using the user terminal 5 by user operation.

Subsequently, after arriving at the conference room, the user connects the user terminal 5 to the system via the access point 4 to receive the conference material. In this embodiment, it is possible to enhance the information security during the session described above.

In FIG. 1, the attendance management terminal 2 and the image forming apparatus 3 are implemented as separate apparatuses. However, that is just an example, and it is possible that the image forming apparatus 3 includes the functions of the attendance management terminal 2. Likewise, it is described that the conference system server 1 and the access point 4 are different apparatuses. However, it is possible that the conference system server 1 includes the functions of the access point 4.

Figure 2:
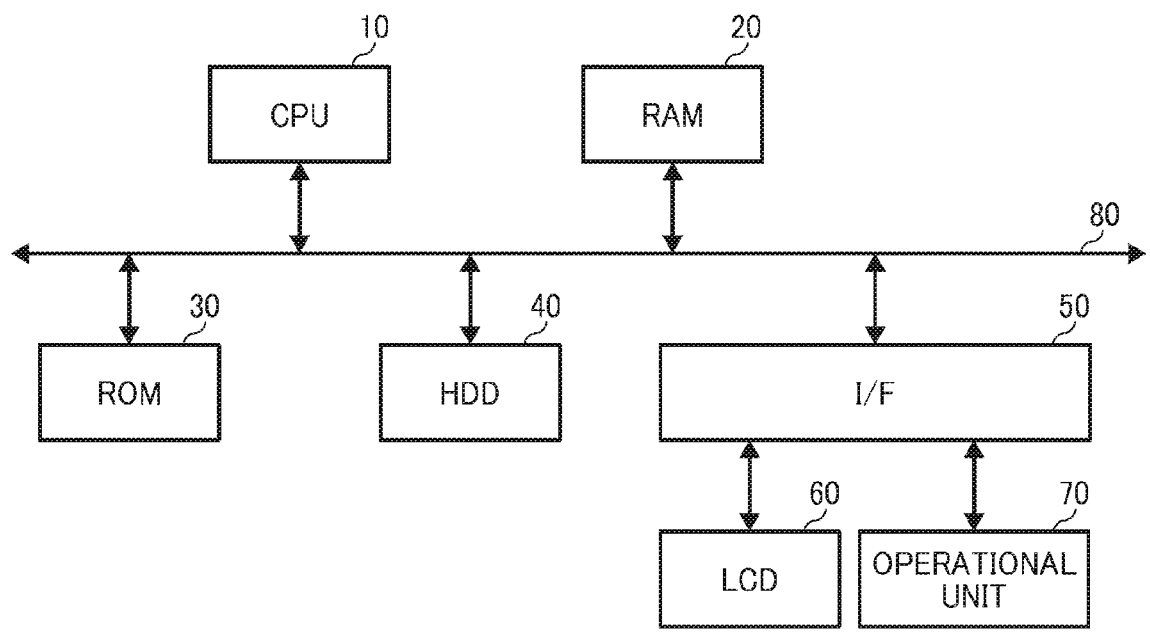
FIG. 2 is a block diagram illustrating a hardware configuration of an information processing apparatus as an embodiment of the present invention.

Next, a hardware configuration of information processing apparatuses such as the conference system server 1, the attendance management terminal 2, the image forming apparatus 3, and the user terminal 5 etc. in this embodiment is described below with reference to FIG. 2. As shown in FIG. 2, the information processing apparatus in this embodiment includes the same configuration as a general server or PC etc.

That is, in the information processing apparatus in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 80. In addition, a Liquid Crystal Display (LCD) 60 and an operational unit 70 are connected to the I/F 50.

The CPU 10 is a processor and controls the whole operation of the information processing apparatus. The RAM 20 is a volatile storage device that can read/write information at high speed and is used as a work area when the CPU 10 processes information. The ROM 30 is a read-only non-volatile storage medium and stores programs such as firmware. The HDD 40 is a non-volatile storage medium that can read/write information and stores the OS, various control programs, and application programs etc.

The I/F 50 connects the bus 80 with various hardware and network etc. and controls them. The LCD 60 is a visual user interface for displaying various information. The operational unit 70 is a user interface such as a keyboard, mouse, touch panel, and various hardware buttons etc. to input information to the information processing apparatus by user operation. In case of the image forming apparatus 3, an engine for printing out is also included in addition to the configuration shown in FIG. 2.

In this hardware configuration described above, a software controlling unit is constructed by executing operation by the CPU 10 in accordance with programs stored in the ROM 30 and programs loaded from storage devices such as HDD 40, and optical discs (not shown in figures) into the RAM 20. Functional blocks that implement capabilities of the conference system server 1, the attendance management server 2, the image forming apparatus 3, and the user terminal 5 of this embodiment are constructed by a combination of the software controlling units described above and hardware.

Figure 3:
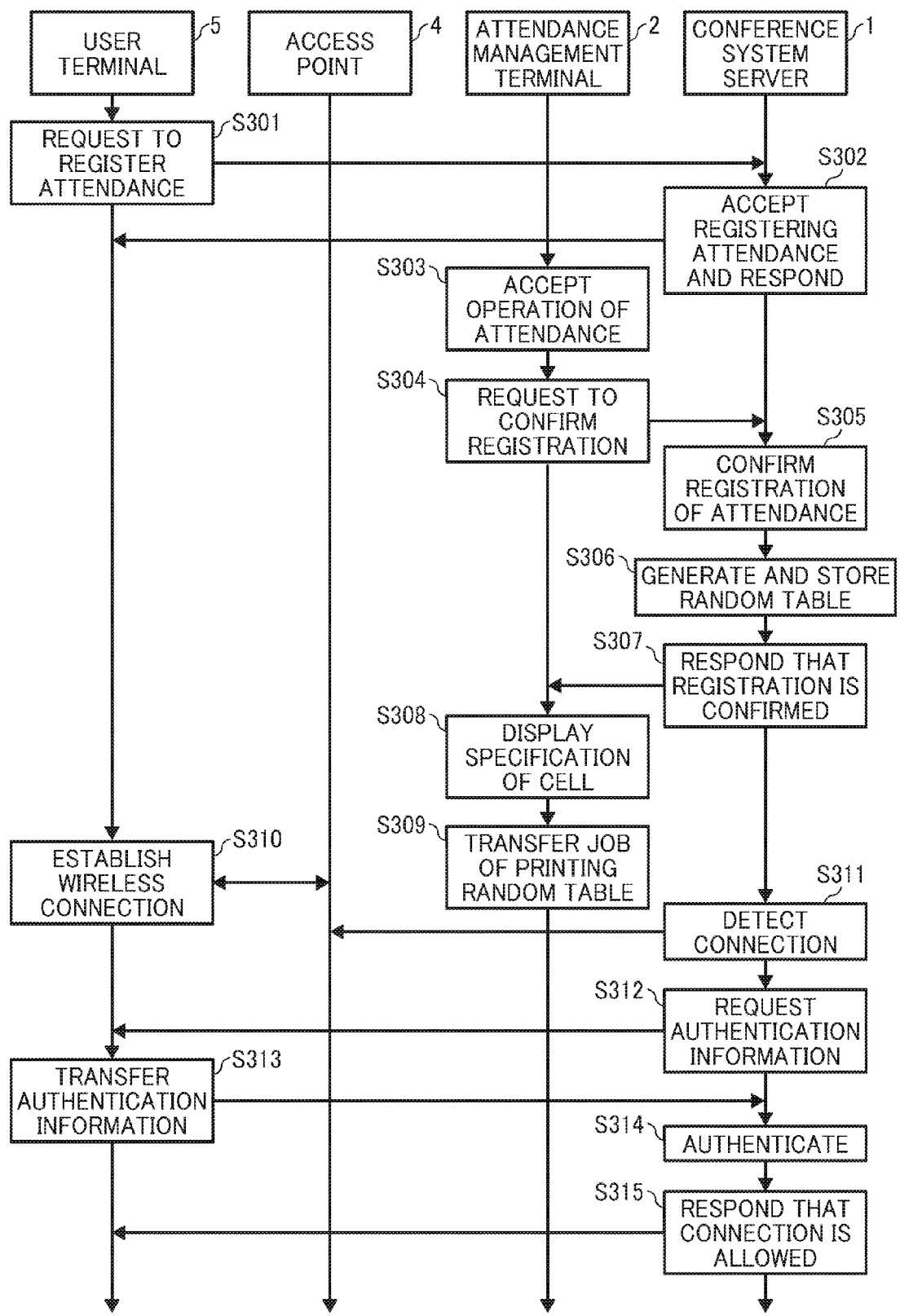
FIG. 3 is a sequence diagram illustrating an operation of the whole system as an embodiment of the present invention.

Here, an operation of the whole conference system in this embodiment is described below with reference to a sequence diagram in FIG. 3. As shown in FIG. 3, first, the user terminal 5 held by a user who attends the conference requests the conference system server 1 to register attendance by user operation in S301. In this case, the user terminal 5 is connected to the conference system server 1 from the outside of the system via the network such as the Internet etc.

In S301, as shown in FIG. 4, the user terminal 5 transfers information including "a conference ID", "a user ID", and "a password" to the conference system server 1. The conference ID is an identifier that identifies a conference at which the user claims to attend. The user ID is an identifier that identifies a user who claims to attend. The password is identification information for authenticating the user who claims to attend.

After accepting the request to register the attendance, the conference system server 1 accepts information shown in FIG. 4, stores the information in a database, and responds to the user terminal 5 as the request origin in S302. In S302, the conference system server 1 stores information on accepting the request for attendance as shown in FIG. 5. In addition, the user terminal 5 displays a screen indicating that the request to register the attendance.

On the day of the conference, user attendance is confirmed using the attendance management terminal 2 set up at the conference room by user operation. FIG. 6 is a diagram illustrating a GUI of a screen for confirming attendance at the conference displayed on the attendance management terminal 2 in this embodiment. As shown in FIG. 6, in confirming his/her attendance at the conference, the user selects "a conference ID" identifying the conference at which the user attends and inputs "a user ID" identifying the user himself/herself and "a password" authenticating the user himself/herself.

After the user operation on the screen in FIG. 6, the attendance management terminal 2 accepts the user attendance in S303. The attendance management terminal 2 transfers the information input on the screen in FIG. 6 to the conference system server 1 and requests to confirm whether or not the user is registered for the attendance in S304.

After accepting the request to confirm the registration, with reference to the information on accepting the request for the attendance in FIG. 5 based on the information received from the attendance management terminal 2, the conference system server 1 confirms whether or not the user who performs the attendance operation is registered in S305. In S305, if a record that includes corresponding conference ID, user ID, and password exists, the conference system server 1 determines that the user is registered and authorized.

After confirming the registration of attendance, the conference system server 1 generates a random table as authentication information used by the conference attendee to connect to the network at the conference room and receive the distributed conference materials and information specifying a cell used for the authentication information in the random table and stores the generated random table in the storage medium in S306.

FIG. 7 is a diagram illustrating the random table in this embodiment. As shown in FIG. 7, the random table in this embodiment is matrix form information that consists of 50 cells in total including 10 cells "A" to "J" in the horizontal direction and 5 cells "1" to "5" in the vertical direction. Each of those cells includes character information generated randomly as random numbers. Various known algorithms can be used for generating the random numbers.

If the user terminal 5 connects to the conference system via the access point 4, in addition to the user ID and the password in FIG. 5, the character in the specified cell in the random table in FIG. 7 is used as the authentication information. Therefore, the conference system server 1 generates and stores information shown in FIG. 8 in S306. It is possible to store the information shown in FIG. 8 separately. Otherwise, it is also possible to store the information on accepting request for attendance in FIG. 5 in addition to information specifying a cell such as "A-4" (hereinafter referred to as "cell specifying information"). It should be noted that the number of cell specifying information is three in FIG. 8. However, that is just an example, and the number of cell specifying information can be equal to or less than two or can be equal to or more than four.

It should also be noted that the conference system server 1 in this embodiment stores all information of the random table shown in FIG. 7. However, only the characters specified by the cell specifying information in FIG. 8 are referred when the user terminal 5 connects to the network of the conference system. As a result, it is possible that the conference system server 1 does not store all information of the random table but stores characters specified by the cell specifying information only as the authentication information.

After generating and storing the information shown in FIG. 8, the conference system server 1 reports to the attendance management terminal 2 that the user is confirmed as the registered attendee to respond that the registration is confirmed in S307. In S307, the conference system server 1 transfers image information for displaying the random table in FIG. 7 and the cell specifying information in FIG. 8 to the attendance management terminal 2.

After receiving the response of confirming registration, the attendance management terminal 2 displays the cell specifying information received from the conference system server 1 on the display in S308. As a result, the user as the attendee can recognize which cell in the random table is used as the authentication information.

In addition, based on the image information received from the conference system server 1, the attendance management terminal 2 transfers a print job for printing out the random table to the image forming apparatus 3 in S309. That is, a module that generates the print job in the attendance management terminal 2 functions as a print controller. As a result, the random table is printed out by the image forming apparatus 3 and passed to the user. Accordingly, the user acquires the random table. In FIG. 3, the attendance management terminal 2 transfers the print job of the random table. However, it is possible that the conference system server 1 transfers the print job of the random table. In this case, a module included in the conference system server 1 functions as the print controller.

In the description in this embodiment, the conference system server 1 generates the cell specifying information, and the attendance management terminal 2 reports the cell specifying information to the user by displaying the cell specifying information on the display. Other than that, for example, it is possible that the user selects a cell by his/her own choice.

In this case, the conference system server 1 stores information associated with the cell specifying information as shown in FIG. 9 in S302. Other than that, it is possible that information of the random table itself is not stored but only a character extracted from the random table using the cell specifying information is stored. After generating the random table in S306, based on the cell specifying information input by user operation, the conference system server 1 stores the character in the specified cell as the authentication information. In this case, only the information on the random table is transferred in S307.

After acquiring the random table, the user terminal 5 is connected to the network of the conference system using wireless communication by user operation. As a result, the user terminal 5 establishes wireless connection with the access point 4 in S310. In S310, for example, in case of using Wi-Fi connection, the user terminal 5 searches for a Service Set IDentifier (SSID) for identifying wireless connection provided by the access point 4 using its own Wi-Fi connecting function to establish the connection.

After the user terminal 5 establishes wireless connection with the access point 4, the conference system server 1 detects that in S311 and requests the user terminal 5 to provide the authentication information for connecting to the conference system in S312. After the user terminal 5 receives the request for the authentication information, a screen for inputting connection authentication information in FIG. 10 is displayed.

As shown in FIG. 10, in the screen for inputting connection authentication information, in addition to entry fields for the user ID and password, entry fields for characters extracted from the random table using the cell specifying information are displayed. On the user terminal 5, in addition to the user ID and password, characters in the cells specified by the cell specifying information are input by user operation. The information described above is the authentication information input based on the random numbers.

After performing the confirming operation by inputting information on the screen for inputting connection authentication information in FIG. 10, the user terminal 5 transfers the input authentication information to the conference system server 1 in S313. After receiving the authentication information from the user terminal 5, the conference system server 1 performs the authentication operation based on the stored information as shown in FIG. 8 in S314.

After performing the authentication operation and confirming that the password and characters for random numbers are accurate, the conference system server 1 confirms that the target user terminal 5 has authority to access the network of the conference system and responds that the connection is allowed in S315. As a result, the user terminal 5 can access the network of the conference system to browse the conference materials and receive images that the conference system broadcasts and live streaming of conferences shot at other sites. As described above, an operation of the whole conference system in this embodiment finishes.

As described above, in the conference system in this embodiment, in accessing the system using wireless connection provided at the conference room, access is controlled by using the random table issued to the conference attendees only. As a result, it is possible to prevent unauthorized people who acquires the user ID and password improperly from accessing the conference system by spoofing.

Figure 11:
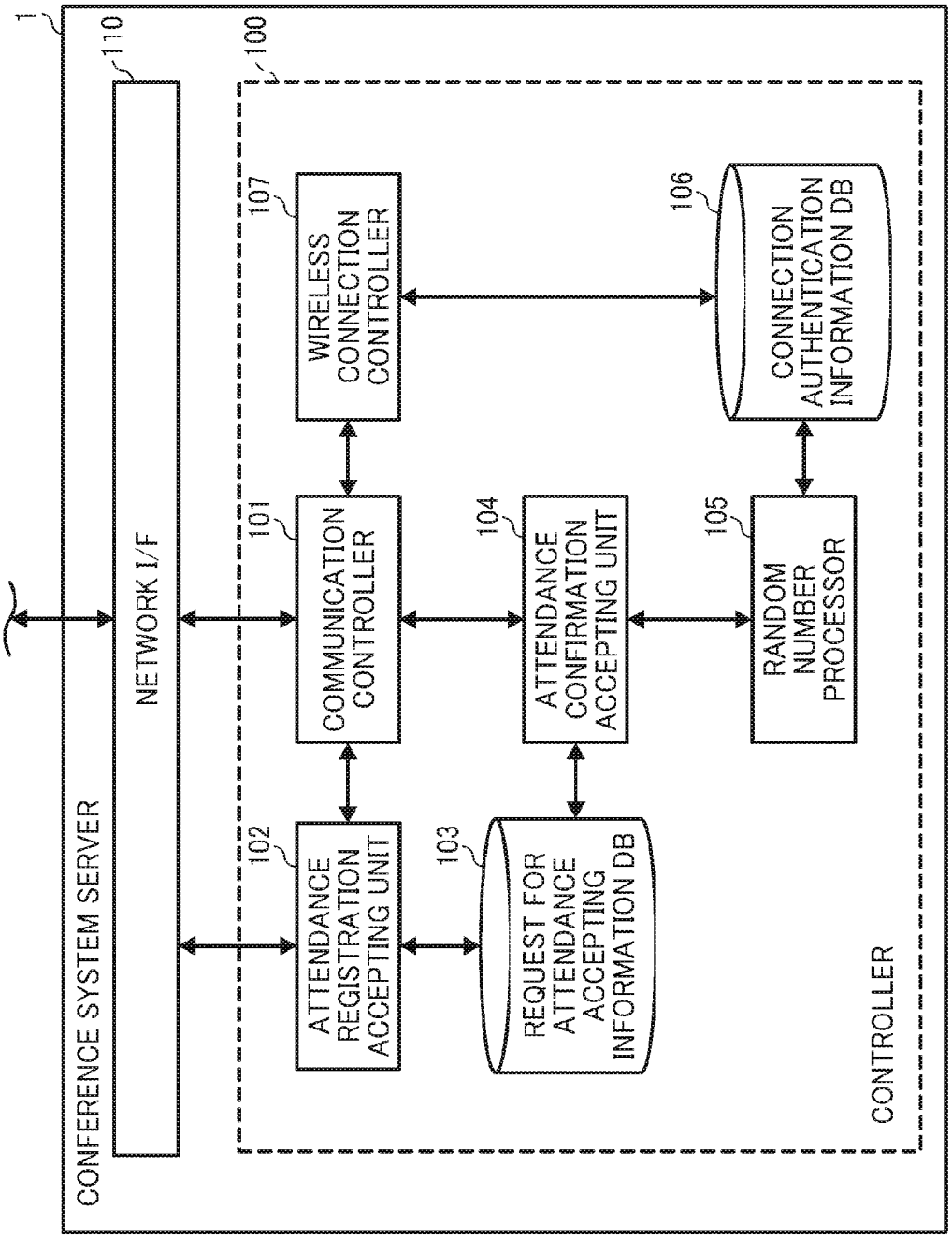
FIG. 11 is a block diagram illustrating a functional configuration of a conference system server as an embodiment of the present invention.

Next, a functional configuration of the conference system server 1 in this embodiment is described below with reference to FIG. 11. As shown in FIG. 11, the conference system server 1 in this embodiment includes a controller 100 and a network I/F 110. The network I/F 110 is an interface that the conference system server 1 communicates with other apparatuses via a network, and Ethernet is used for the network I/F 110 for example.

The controller 100 combines software and hardware and functions as a controlling unit that controls the whole conference system server 1. As shown in FIG. 11, the controller 100 includes a communication controller 101, an attendance registration accepting unit 102, a request for attendance accepting information database (DB) 103, an attendance confirmation accepting unit 104, a random number processor 105, a connection authentication information DB 106, and a wireless connection controller 107.

The communication controller 101 controls exchanging information with apparatuses outside by the controller 100 via the network I/F 110. The attendance registration accepting unit 102 accepts the request to register attendance in S301 in FIG. 3 and registers the information in FIG. 5. The request for attendance accepting information DB 103 stores and manages the information on accepting the request for attendance in FIG. 5.

The attendance confirmation accepting unit 104 accepts the request to confirm registration in S304 in FIG. 3, confirms attendee's registration in S305, and responds that the registration is confirmed in S307. In S305, the attendance confirmation accepting unit 104 refers to the information in FIG. 5 stored in the request for attendance accepting information DB 103 and confirms whether or not the attendance is registered by checking the information input on the screen for confirming attendance at the conference in FIG. 6.

In addition, in S307, the attendance confirmation accepting unit 104 controls transferring the random table and the cell specifying information generated as shown in FIG. 7 to the user terminal 5. That is, in S307, the attendance confirmation accepting unit 104 functions as a random number output unit. The random number processor 105 generates the random table in FIG. 7 and the information in FIG. 8 in S306 in FIG. 3 and registers the generated information in the connection authentication information DB 106.

Under control of the random number processor 105, the connection authentication information DB 106 stores and manages the random table in FIG. 7 and the information in FIG. 8. The wireless connection controller 107 performs an operation in steps S311 to S315 in FIG. 3. Especially, in S314, based on the information input on the screen in FIG. 10, the wireless connection controller 107 refers to the connection authentication information DB 106 and determines whether or not the password and characters selected from the random numbers correspond.

Figure 12:
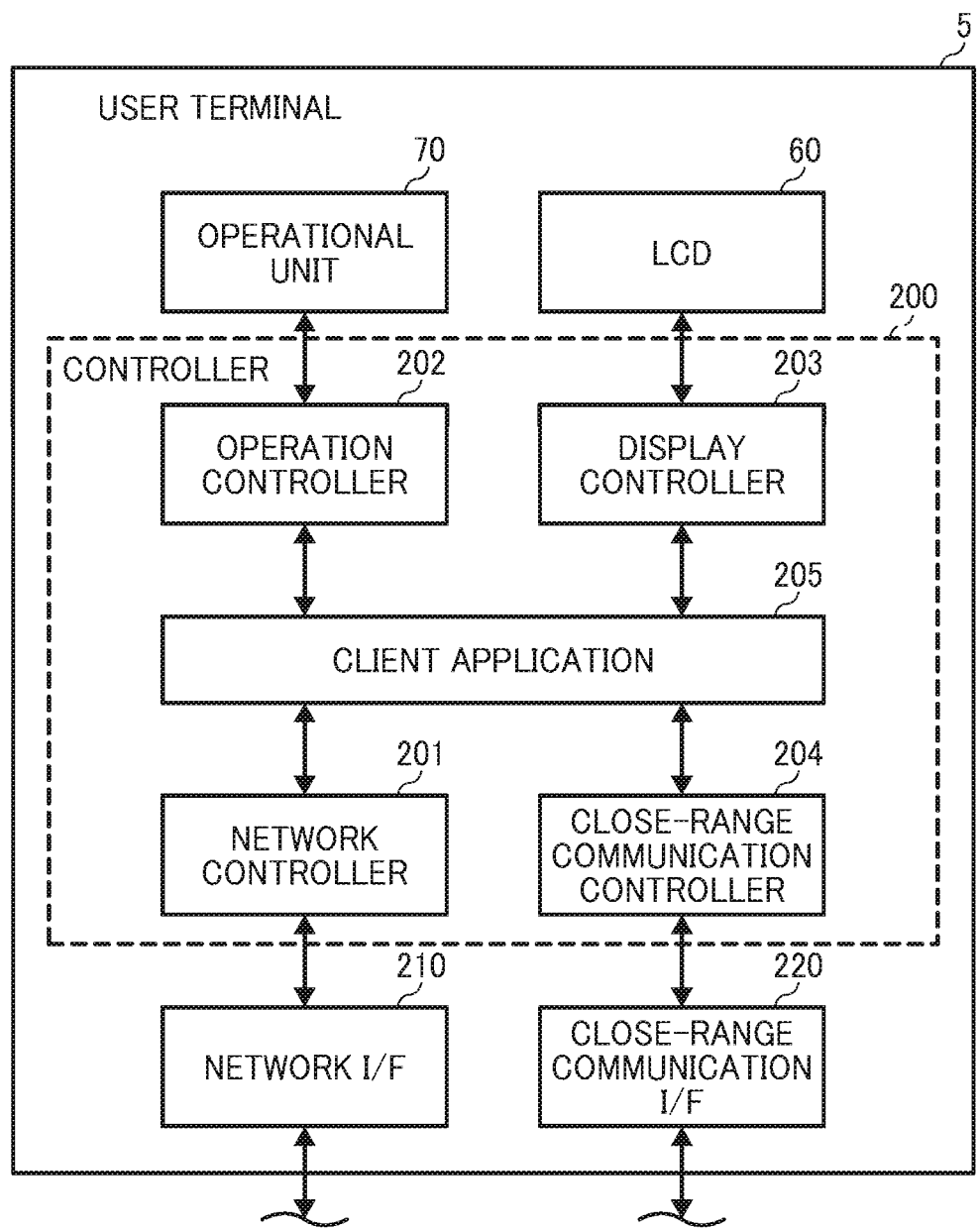
FIG. 12 is a diagram illustrating functional blocks in a user terminal as an embodiment of the present invention.

Next, a functional configuration of the user terminal 5 in this embodiment is described below with reference to FIG. 12. As shown in FIG. 4, in addition to the LCD 60 and the control panel 70 shown in FIG. 2, the user terminal 5 in this embodiment includes a controller 200, a network I/F 210, and a close-range communication I/F 220. The controller 200 includes a network controller 201, an operational controller 202, a display controller 203, a close-range communication controller 204, and a client application 205.

The network I/F 210 is an interface that the user terminal 5 communicates with other apparatuses via a network, and an interface such as Ethernet is used for the network I/F 210. The close-range communication I/F 220 is an interface that the user terminal 5 communicates with other apparatuses by close-range wireless communication, and interfaces such as Bluetooth and Wi-Fi are used as the close-range communication I/F 211.

In this embodiment, the close-range communication I/F 220 connects to the access point 4 wirelessly, and the user terminal 5 connects to the network of the conference system. On the other hand, in case of requesting the conference system server 1 to register attendance, communication via the network I/F 210 is performed. The network I/F 210 and the close-range communication I/F 211 are implemented by the I/F 50 in FIG. 2.

The controller 200 combines software and hardware. The controller 200 functions as a controller that controls the whole part of the user terminal 5. The network controller 201 acquires information input via the network I/F 210 and transfers information to other apparatuses via the network I/F 210. The close-range communication controller 204 acquires information input via the close-range communication I/F 220 and transfers information to other apparatuses via the close-range communication I/F 220.

The operation controller 202 acquires a signal of user operation on the operational unit 70 and input the signal to a module that operates on the user terminal 5 such as the client application 205 etc. The display controller 203 displays a status of the user terminal 5 such as a GUI of the client application 205 on the LCD 60 as a display unit of the user terminal 5.

The client application 205 is a software module that provides various functions on the user terminal 5 and consists of software programs corresponding to each function. A dedicated application for using the conference system in this embodiment is also included in the client application 205. As a result, GUIs such as shown in FIGS. 6 and 10 are displayed using the function of the client application 205.

Figure 13:
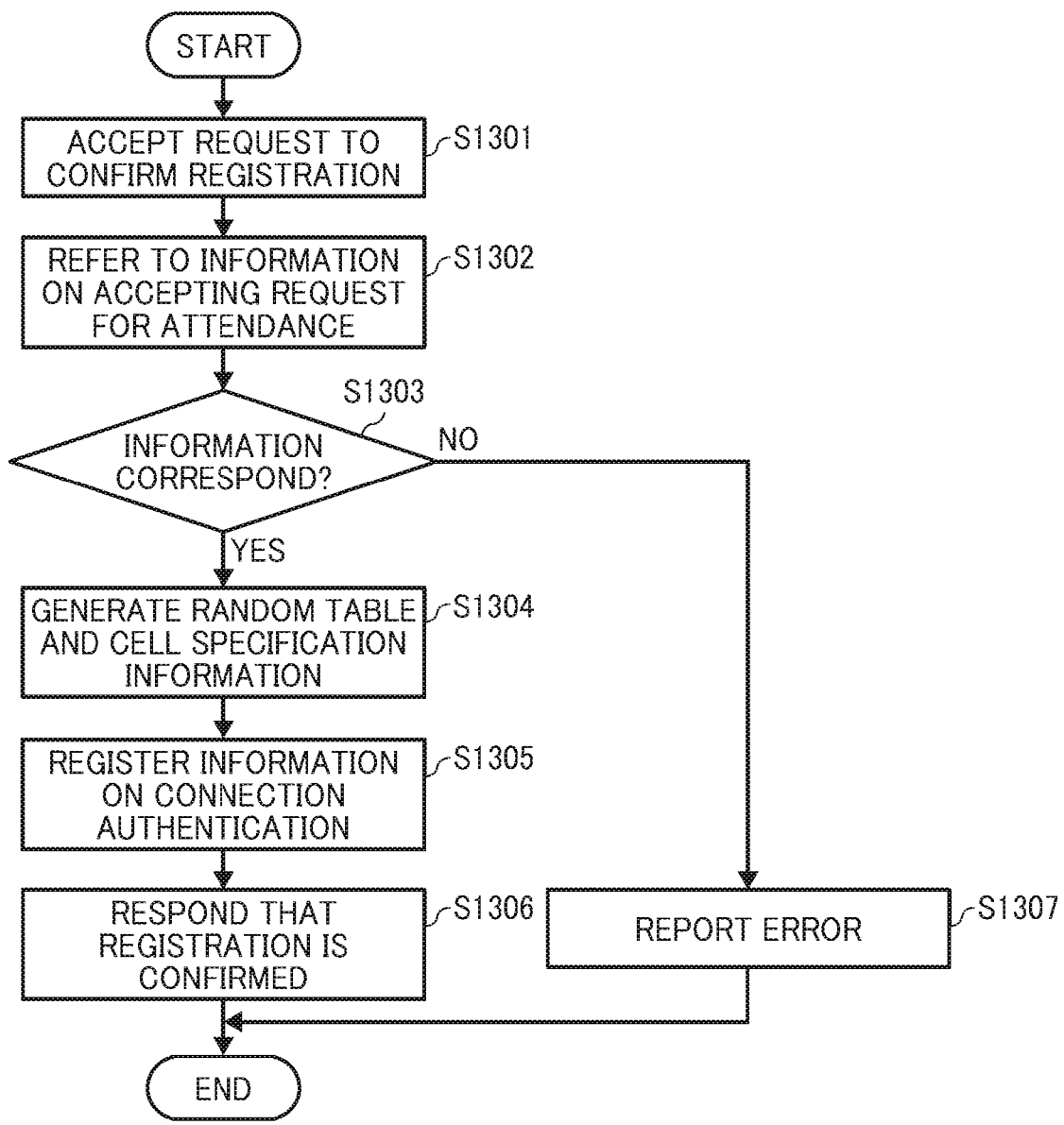
FIG. 13 is a flowchart illustrating an operation of confirming attendance as an embodiment of the present invention.

Next, an operation of the conference system server 1 in this embodiment is described below. First, an operation of confirming attendance in steps S305 to S307 in FIG. 3 is described below with reference to FIG. 13. As shown in FIG. 13, first, the attendance confirmation accepting unit 104 acquires a request to conform registration from the attendance management terminal 2 in S1301. After receiving the request to confirm registration, the attendance confirmation accepting unit 104 acquires information input on the screen in FIG. 6 (hereinafter referred to as "attendance confirmation information") and refers to the request for attendance accepting information DB 103 in S1302.

After referring to the information in S1302, the attendance confirmation accepting unit 104 determines whether or not the request for attendance accepting information DB 103 stores a record whose content corresponds to the attendance confirmation information in S1303. If the information whose content corresponds to the attendance confirmation information is stored in the request for attendance accepting information DB 103 (YES in S1303), the attendance confirmation accepting unit 104 instructs the random number processor 105 to generate the random table and the cell specifying information in S1304.

After generating the random table and the cell specifying information in accordance with the request from the attendance confirmation accepting unit 104, the random number processor 105 stores the information of the random table and information in FIG. 8 as the connection authentication information in the connection authentication information DB 106 in S1305. As described above, the connection authentication information can be not only the random table and the cell specifying information but also character information extracted from the random table in accordance with the cell specifying information After the random number processor 105 registers the information in the connection authentication information DB 106, the attendance confirmation accepting unit 104 transfers a response to confirm registration including image information for displaying the random table and the cell specifying information to the attendance management terminal 2 in S1306, and the process ends. By contrast, if there is no information whose content corresponds (NO in S1303), the attendance confirmation accepting unit 104 reports an error to the attendance management terminal 2 in S1307, and the process ends.

Figure 14:
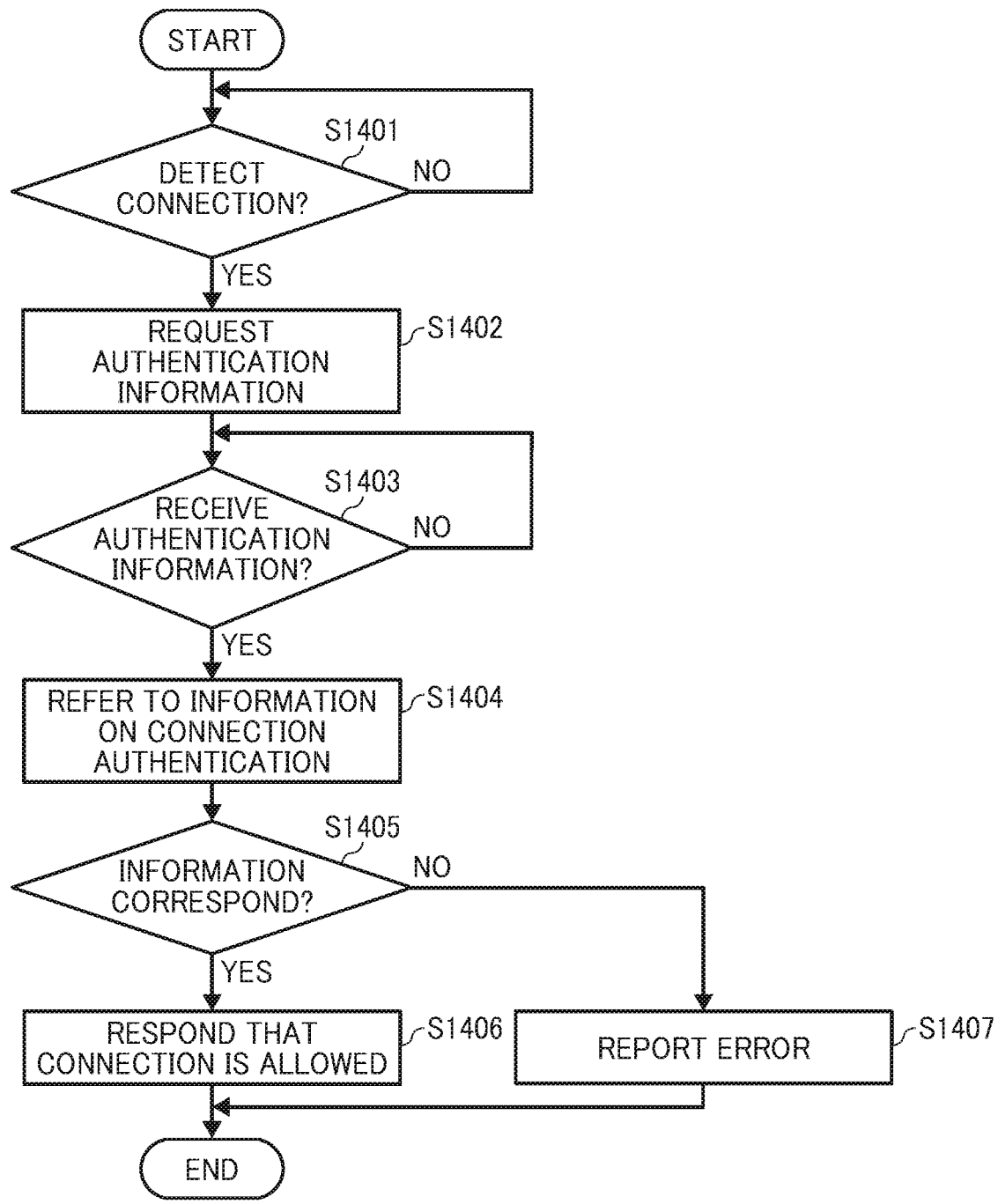
FIG. 14 is a flowchart illustrating an operation of authenticating connection as an embodiment of the present invention.

Next, an operation of authenticating connection in steps S311 to S315 in FIG. 3 is described below with reference to FIG. 14. As shown in FIG. 14, the wireless connection controller 107 monitors whether or not the user terminal 5 connects to the access point 4 in S1401. After detecting that the user terminal 5 connects to the access point 4 (NO in S1401), the wireless connection controller 107 requests the user terminal 5 that establishes the connection to provide the authentication information in S1402. As a result, on the user terminal 5, a screen for inputting connection authentication information in FIG. 10 is displayed.

The wireless connection controller 107 waits until the connection authentication information is input on the screen in FIG. 10 is received (NO in S1403). After receiving the connection authentication information (YES in S1403), the wireless connection controller 107 refers to the connection authentication information DB 106 based on the received connection authentication information in S1404. After referring to the information in S1404, the wireless connection controller 107 determines whether or not a record whose content corresponds to the information received from the user terminal 5 is stored in the connection authentication information DB 106 in S1405.

Figures 15, 16:
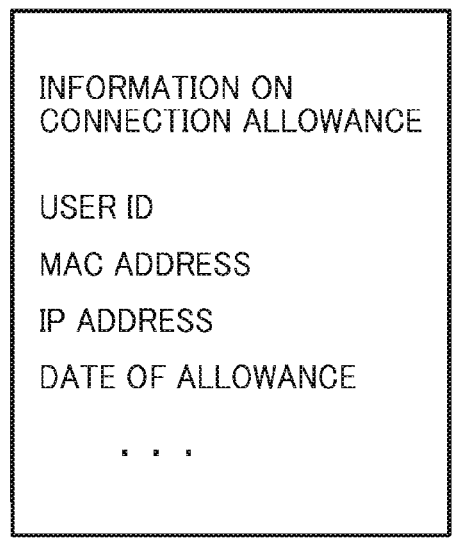
FIG. 15 is a diagram illustrating information on allowing connection as an embodiment of the present invention.
FIG. 16 is a diagram illustrating information on accepting a request for attendance as an embodiment of the present invention.

If information whose content corresponds is stored in the connection authentication information DB 106 (YES in S1405), the wireless connection controller 107 allows the user terminal 5 whose connection is detected in S1401 to connect to the network of the conference system and responds that the connection is allowed in S1406. For example, as shown in FIG. 15, in S1406, the wireless connection controller 107 generates and stores connection allowance information including MAC address for identifying the user terminal 5.

In wireless communication connections such as Wi-Fi, a format exchanged in transmitting and receiving information includes MAC address of a terminal. Therefore, the wireless connection controller 107 monitors the exchanged information, and the wireless connection controller 107 allows to exchange the information if MAC address included in the information corresponds to MAC address registered in the connection allowance information as shown in FIG. 15.

As a result, it is possible to control access in the network of the conference system. As shown in FIG. 15, in addition to MAC address, it should be noted that the connection allowance information in this embodiment includes the user ID of the user terminal 5 allowed to connect and information on date when the connection is allowed.

By contrast, if there is no information whose content corresponds (NO in S1405), the wireless connection controller 107 reports an error to the user terminal 5 in S1407, and the process ends. In this case, while the user terminal 5 establishes the wireless communication connection with the access point 4, since the conference system server 1 does not allow the connection, the user terminal 5 cannot connect to the network of the conference system.

As described above, in the conference system in this embodiment, in connecting to the wireless communication provided at the conference room, the connection authentication using not the user ID and password but the random table is performed. In addition, since the random table is distributed to attendees confirmed the attendance by hand, it is possible to keep risk of leaking information low until the day of the conference. Accordingly, it is possible to prevent a cracker who acquired the user ID and password improperly from receiving radio wave of wireless communication outside the conference room and connecting to the network by spoofing.

Since the attendee performs the attendance confirming operation using the attendance management terminal 2 at the conference room, it is possible to prevent from processing improper attendance confirming operation by spoofing. Therefore, it is difficult that the cracker who acquired the user ID and password improperly also acquires the random table, and it is possible to enhance security. Even if the cracker acquires the random table, it is impossible to authenticate the connection in FIG. 14 considering that the cell specifying information is not known, and it is possible to enhance security in that regard.

Since the attendance confirming operation is associated with the operation of allowing the network connection, it is possible to enhance security furthermore using the attendance confirming operation. A specific case is described below.

For example, if the number of attendees is very large, it is possible to check respective attendees' faces visually. As a result, it is possible to allow a cracker to confirm attendance. In this case, if an authorized attendee and a cracker confirm their attendance using the same user ID and password, the confirmation of attendance is performed for the same user ID redundantly. An operation that enhances security in that case is described below.

FIG. 16 is a diagram illustrating information on accepting a request for attendance in that case. As shown in FIG. 16, information on "confirmation of attendance" is associated with each record of registering attendance. When the record is generated, the confirmation of attendance is "not yet". If the operation of confirming attendance in FIG. 13 is performed, the information on the confirmation of attendance is updated to "confirmed".

Figure 17:
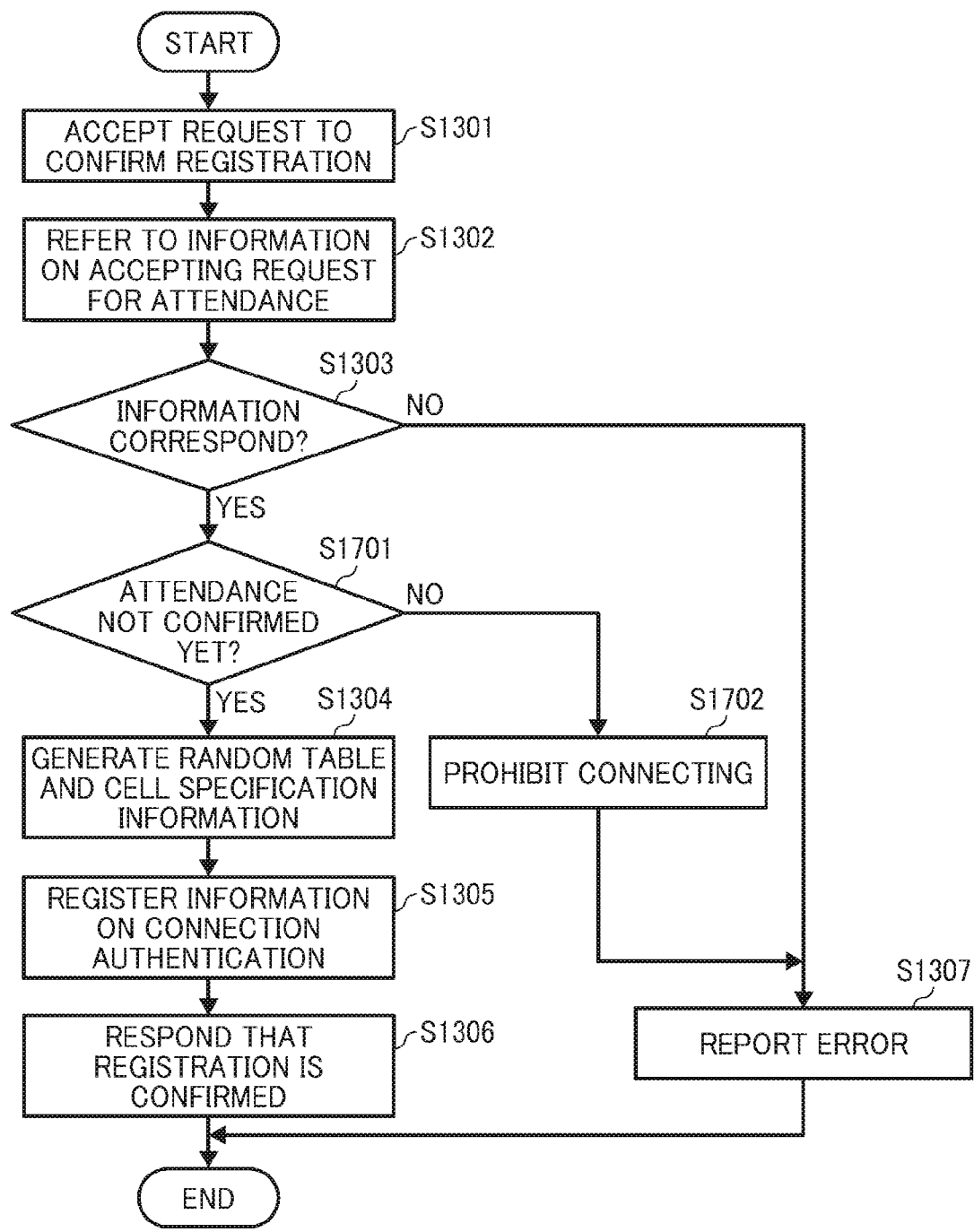
FIG. 17 is a flowchart illustrating another operation of confirming attendance as an embodiment of the present invention.

If the operation of confirming attendance is performed again on the record whose confirmation of attendance has been updated to "confirmed", it is determined that the confirmation of attendance as error. Simultaneously, the user terminal 5 used by attendee who has already confirmed attendance is prohibited to connect to the network. As a result, it is possible to keep advanced security. FIG. 17 is a flowchart illustrating another operation of confirming attendance in that case. As shown in FIG. 17, the operation is performed similarly to FIG. 13 until S1303.

If the corresponding information is stored in the request for attendance accepting information DB 103 (YES in S1303), the attendance confirmation accepting unit 104 refers to the confirmation of attendance field of the record to check whether or not attendance has already been confirmed in S1701. If attendance has not been confirmed yet (YES in S1701), the operation after S1304 is performed just like in FIG. 13. In this case, the attendance confirmation accepting unit 104 updates the confirmation of attendance field in the corresponding record to "confirmed".

By contrast, if attendance has already been confirmed (NO in S1701), the attendance confirmation accepting unit 104 determines that either the user who has already confirmed attendance or the user who is confirming attendance currently is spoofing. In that case, the attendance confirmation accepting unit 104 prohibits to connect to the network in S1702.

In S1702, the attendance confirmation accepting unit 104 instructs the wireless connection controller 107 to delete the connection allowance information in FIG. 15. As a result, while the user terminal 5 connected to the network of the conference system after the attendance confirmation and the operation in FIG. 14, the conference system server 1 prohibits the user terminal 5 to perform communication.

In some cases, the operation in FIG. 14 has not been performed yet after the attendance confirmation, and it is possible that the connection allowance information in FIG. 15 has not been generated yet. Therefore, in S1702, the attendance confirmation accepting unit 104 deletes a record that includes corresponding conference ID, user ID, and password from the connection authentication information DB 106.

As a result, even if the cracker performs the wireless communication connection after that, since the information is deleted from the connection authentication information DB 106, the corresponding information is not extracted in S1405 in FIG. 14, and the connection is not allowed. Accordingly, it is possible to prevent the spoofing cracker from connecting to the network of the conference system.

After prohibiting to connect in S1702, the attendance confirmation accepting unit 104 reports an error in S1307. As described above, if spoofing occurs by the cracker, it is possible to detect that appropriately and shut down the access.

Even in the case of FIG. 17, if the spoofing cracker confirms attendance earlier than the authorized attendee confirms attendance and connects the wireless communication, it is possible that the communication by the spoofing cracker is allowed until the authorized attendee confirms attendance. To cope with that issue, after all attendees who plan to attend the conference finish confirming attendance, it is possible to allow to access the conference system using the user terminal 5 that establishes connection with the access point 4.

Figure 18:
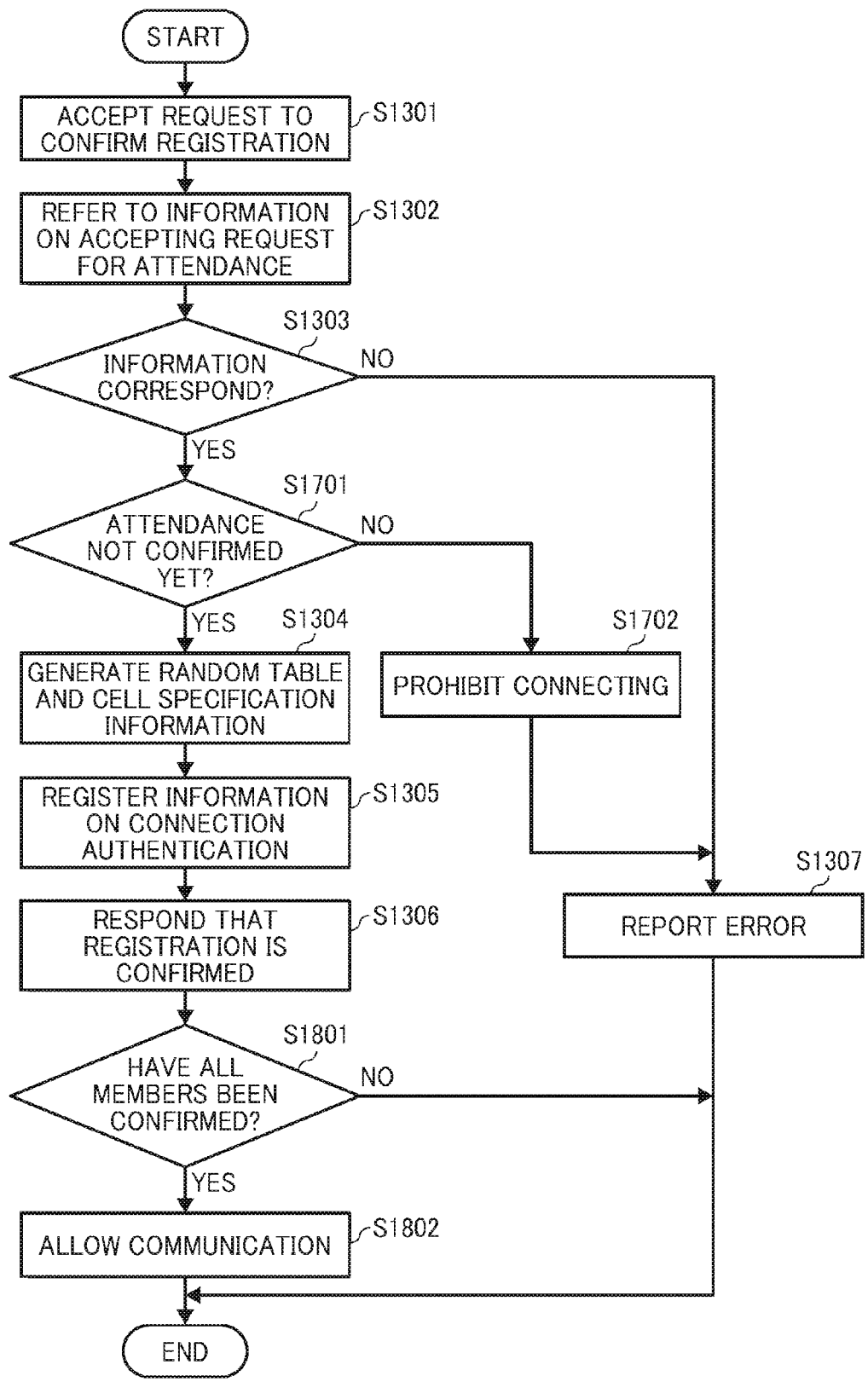
FIG. 18 is a flowchart illustrating yet another operation of confirming attendance as an embodiment of the present invention.

FIG. 18 is a flowchart illustrating an operation of confirming attendance allowing to access the network of the conference system via the access point 4 after all attendee finish confirming attendance. As shown in FIG. 18, the operation is performed similarly to FIG. 13 in steps S1301 to S1307 and similarly to FIG. 17 in steps S1701 and S1702.

After confirming registration in S1306 and updating the confirmation of attendance field in the corresponding record to "confirmed", the attendance confirmation accepting unit 104 checks whether or not all confirmation of attendance field in the corresponding record of the information on accepting request for attendance for the corresponding conference are updated to "confirmed" in S1801. In S1801, based on the conference ID specified in the request to confirm registration accepted in S1301, the attendance confirmation accepting unit 104 filters the information on accepting request for attendance and checks whether or not all confirmation of attendance fields for all extracted records are "confirmed".

After the check, if there is a record whose attendance has not been confirmed (NO in S1801), the attendance confirmation accepting unit 104 finishes the operation as is. By contrast, if it is confirmed that all attendees are attending the conference (YES in S1801), the attendance confirmation accepting unit 104 reports the target conference ID to the wireless connection controller 107 to report that the communication is allowed in S1802.

Figure 19:
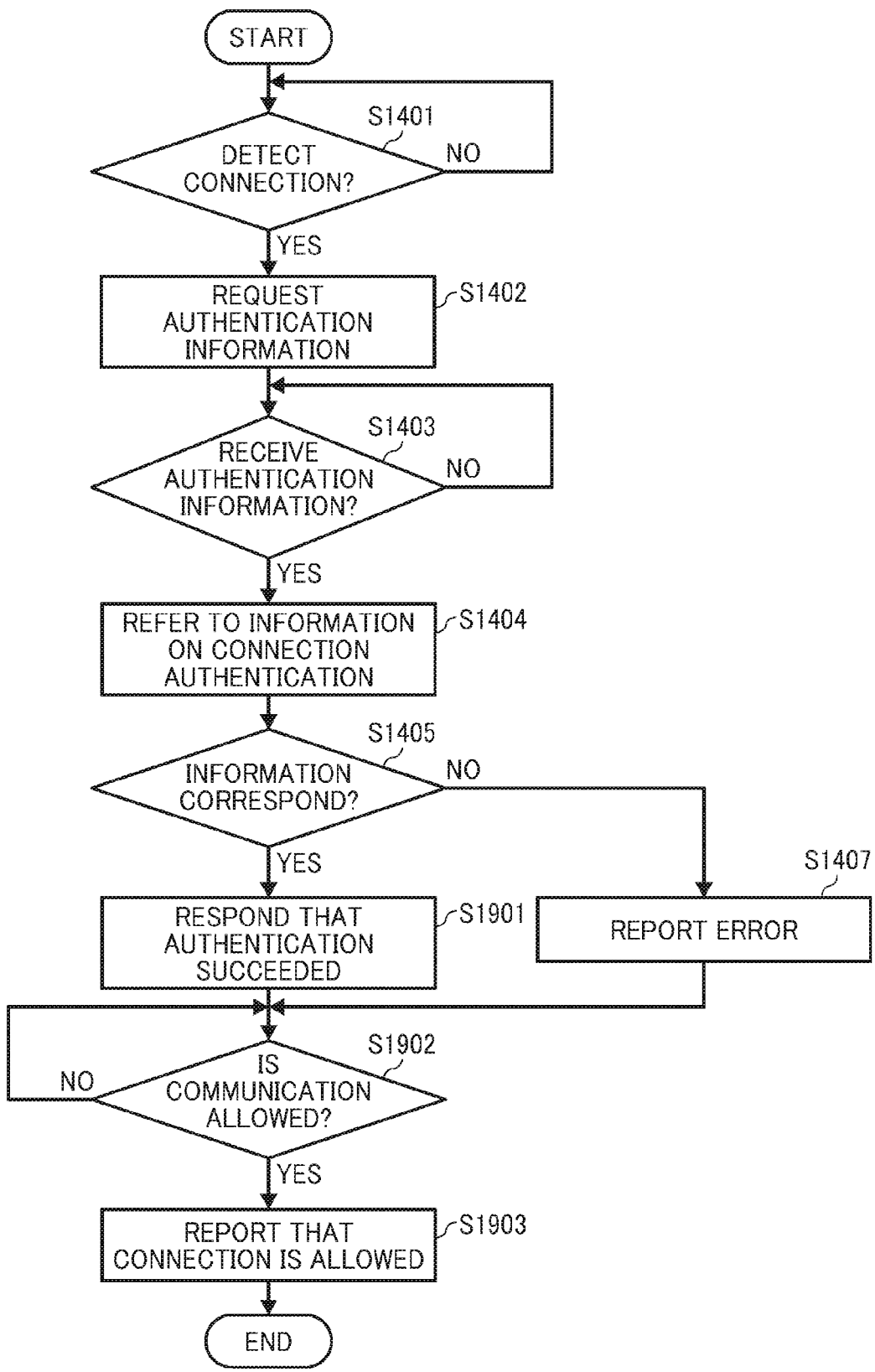
FIG. 19 is a flowchart illustrating an operation of authenticating connection as an embodiment of the present invention.

FIG. 19 is a flowchart illustrating an operation of authenticating wireless connection corresponding to the case in FIG. 18. As shown in FIG. 19, the wireless connection controller 107 performs the same operation as in FIG. 14 in steps S1401 to S1405 and S1407. If the corresponding information is extracted from the connection authentication information DB 106 in S1405, the wireless connection controller 107 does not respond reporting that the connection is allowed but performs authenticated response indicating that the wireless connection has been authenticated in S1901.

Figure 20:
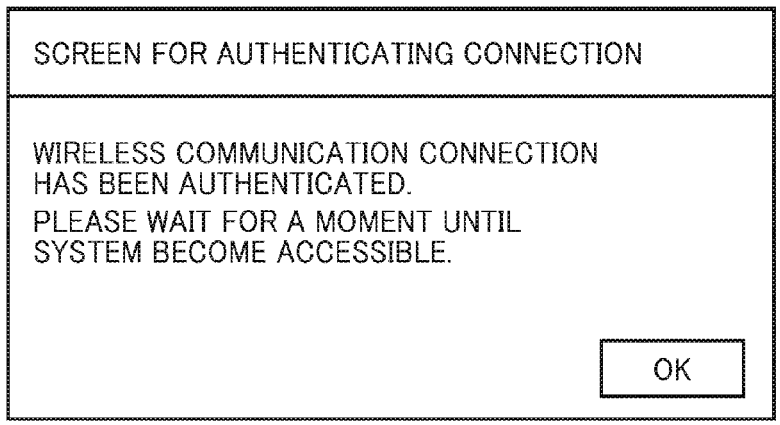
FIG. 20 is a diagram illustrating a screen for authenticating connection as an embodiment of the present invention.

FIG. 20 is a diagram illustrating a screen displayed on the user terminal 5 by the response in S1901. As shown in FIG. 20, in addition to the notification indicating that the authentication by random numbers succeeded, it is reported that the connection to the system has not been started yet. In S1907, the wireless connection controller 107 generates and stores connection allowing information including the conference ID as shown in FIG. 20 instead of the connection allowance information shown in FIG. 15.

Next, the wireless connection controller 107 waits until the notification by the communication allowing operation in S1802 in FIG. 18 is received (NO in S1902). Subsequently, after receiving the notification by the communication allowing operation in S1802 in FIG. 18 (YES in S1902), the wireless connection controller 107 reports the connection allowing notification to the corresponding user terminal 5 in S1903.

Figure 21:
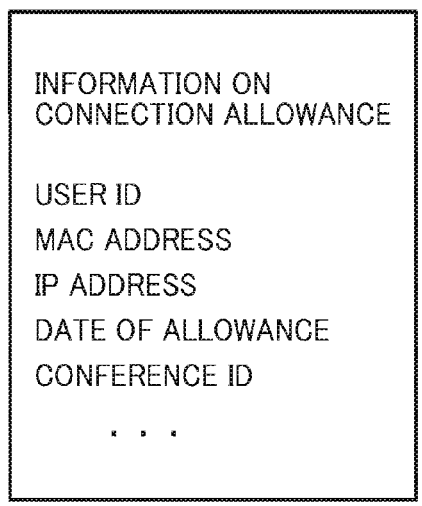
FIG. 21 is a diagram illustrating another information on allowing connection as an embodiment of the present invention.
Figure 22:
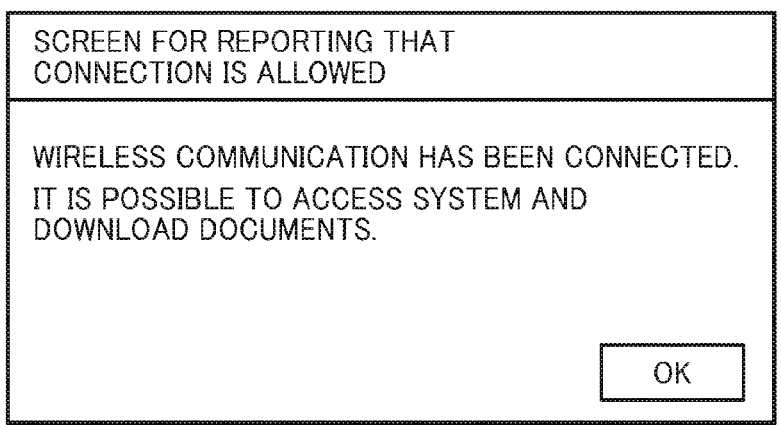
FIG. 22 is a diagram illustrating a screen for reporting that connection is allowed as an embodiment of the present invention.

In S1903, the wireless connection controller 107 reports the connection allowing notification to specified IP address including the conference ID notified in the communication allowing operation among the stored connection allowing information as shown in FIG. 21. FIG. 22 is a diagram illustrating a screen displayed on the user terminal 5 after receiving the connection allowing notification. As shown in FIG. 22, it is reported that it has become possible to access the system.

In the embodiment described above, even if the user terminal 5 whose connection allowing information is stored tries to access the system, it is not allowed to access the system if the response of allowing connection in S1802 in FIG. 18 is not performed for the corresponding conference ID. As a result, it is possible to restrict the access to the conference system by the attendees' user terminals 5 until it is confirmed that all attendees are attending. Accordingly, it is possible to control so that a certain period of time when the spoofing cracker can access the system as described before does not occur.

Figure 23:
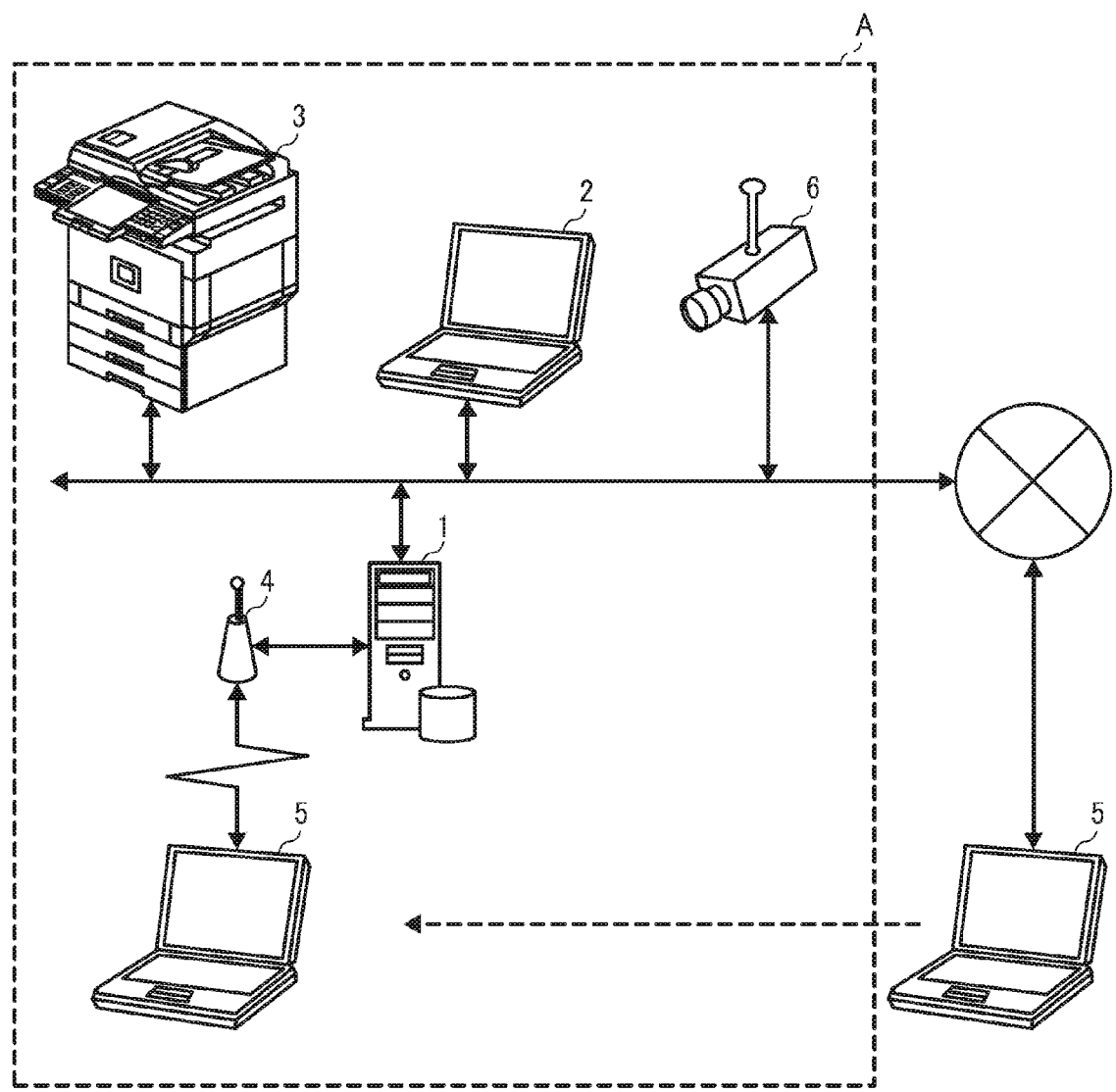
FIG. 23 is a diagram illustrating another system as an embodiment of the present invention.

In the conference system in this embodiment, even in case of the spoofing cracker, the cracker needs to confirm attendance by operating the attendance management terminal 2 without exception. In that case, the cracker needs to stand at a position where the attendance management terminal 2 is located. Therefore, as shown in FIG. 23, by installing a monitoring camera 6 at a place where the attendance management terminal 2 is located, it is possible to record an image of the attendees who confirms attendance by operating the attendance management terminal 2.

In this case, the monitoring camera 6 shoot an surrounding area including the attendance management terminal 2 at the timing of confirming attendance. Subsequently, the conference system server 1 stores the image information generated by the shooting associated with the information on accepting a request for attendance in FIG. 5. As a result, it is possible to find the cracker in an expeditious way. In this case, a module included in the conference system server 1 functions as an image acquisition unit.

For example, if the corresponding record indicates that the attendance has already been confirmed in S1701 in FIG. 18, the attendance confirmation accepting unit 104 performs the connection prohibiting operation in S1702 and displays the image shot when the record's attendance is confirmed on the attendance management terminal 2. As a result, on the attendance management terminal 2, an organizer or a staff member of the conference room checks the displayed image, and it is possible to find the spoofing cracker.

Embodiment 2

Figure 24:
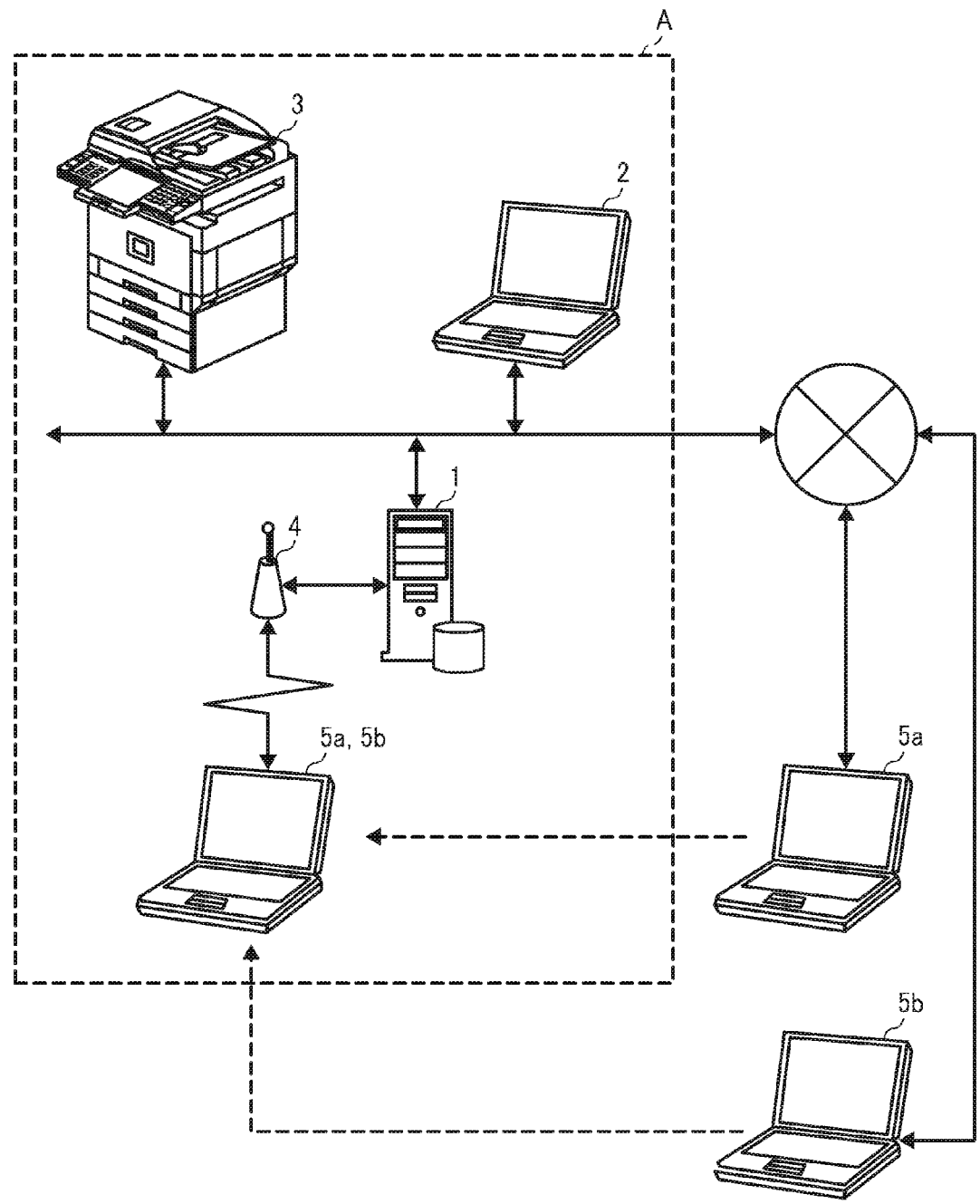
FIG. 24 is a diagram illustrating a system as another embodiment of the present invention.

In the embodiment 1 described above, attendees of the conference are confirmed by using the attendance management terminal 2. In this embodiment, it is possible to keep advanced information security by using a more simplified conference system. In the conference system in this embodiment, as shown in FIG. 24, the attendance management terminal 2 is removed, and user terminals 5a and 5b are added.

The user terminal 5a is an information processing terminal used by an attendee who registers information on the held conference on the conference system server 1. In addition, the user terminal 5b is an information processing terminal that receives information required for attending the conference from the user terminal 5a. In the below description, if it is unnecessary to distinguish the user terminal 5a from the user terminal 5b, the description "the user terminal 5" is used.

Figure 25:
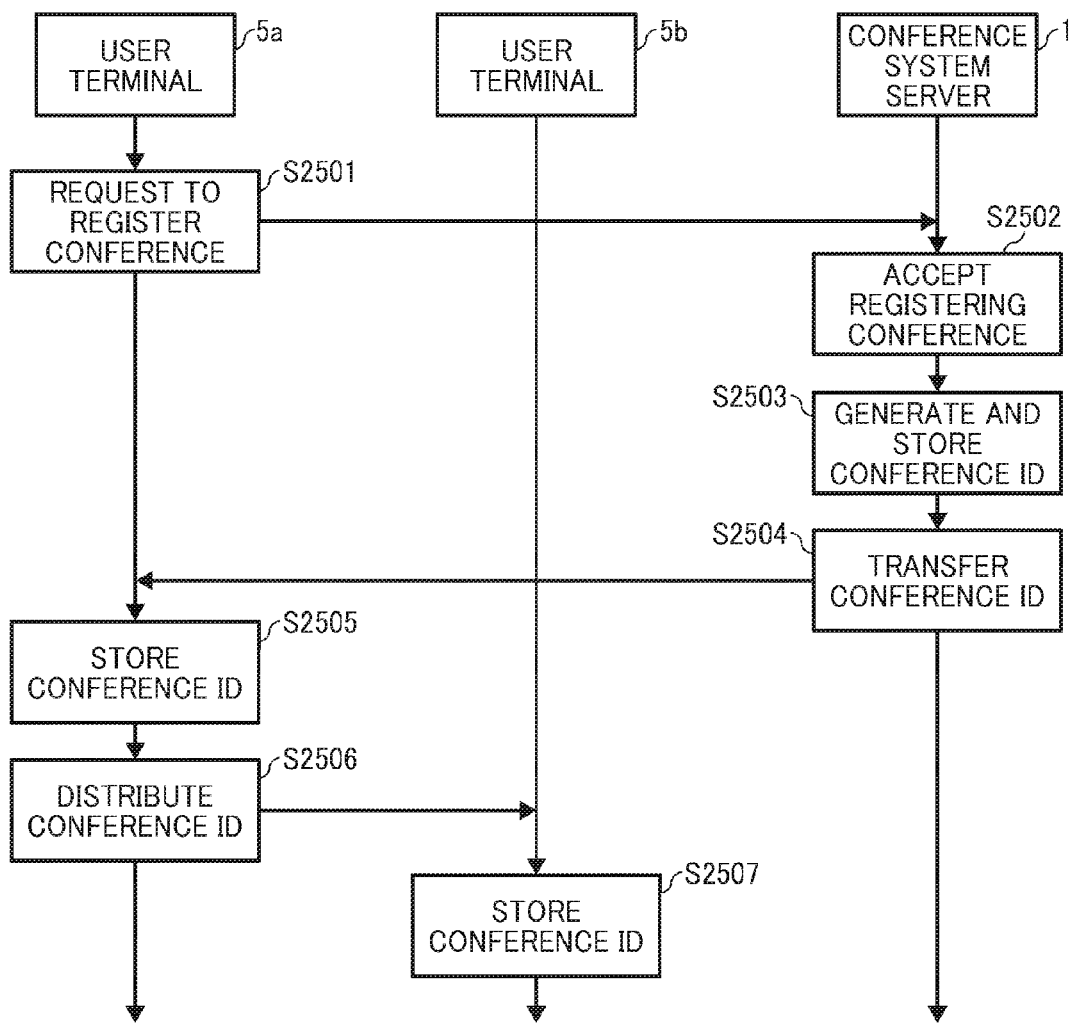
FIG. 25 is a sequence diagram illustrating an operation of the whole system as the other embodiment of the present invention.

Here, an operation of the whole conference system in this embodiment is described below with reference to a sequence diagram in FIG. 25. As shown in FIG. 25, first, the user terminal 5a held by an organizer of the conference requests the conference system server 1 to register the conference by user operation in S2501. In this case, the user terminal 5a is connected to the conference system server 1 from the outside of the system via the network such as the Internet etc.

Figure 26:
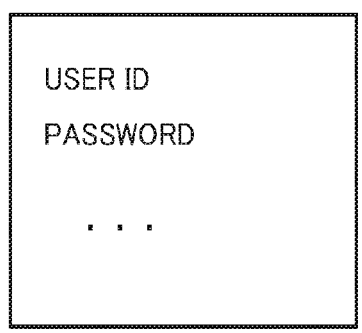
FIG. 26 is a diagram illustrating information included in a request to register a conference as the other embodiment of the present invention.

In S2501, as shown in FIG. 26, the user terminal 5a transfers information including "a user ID" and "a password" to the conference system server 1. The user ID is an identifier that identifies attendees who are invited to the conference to be held. The password is identification information for authenticating the invited attendee as a principle.

After accepting the request to register the conference in S2501 and accepting the information in FIG. 26 in S2502, the conference system server 1 generates and stores the random table in FIG. 7 as the authentication information required when the invited attendee receives the conference materials by connecting the network at the conference room and "the conference ID" as the authentication information generated based on the random table in S2503.

It is also possible that the random table and the conference ID as the authentication information generated based on the random table are generated for each of the invited attendees and stored in the conference system server 1. FIG. 27 is a diagram illustrating the authentication information including the conference ID generated based on the same random table. FIG. 28 is a diagram illustrating the authentication information including the conference ID generated based on the random table generated for each attendee.

As shown in FIG. 27, in case of generating the conference ID based on the same random attendee, the same conference ID is generated for all attendees. By contrast, as shown in FIG. 28, in case of generating the conference ID based on the random tables generated for each attendee, different conference IDs are generated for each of the attendees. The random number processor 105 stores the authentication information in FIGS. 27 and 28 in the connection authentication information DB 106.

Next, the conference system server 1 transfers the generated conference ID to the user terminal 5a in S2504. The user terminal 5a stores the received conference ID in S2505 and distributes the conference ID to the user terminal 5b held by the invited attendee using e-mail etc. in S2506. After receiving the conference ID, the user terminal 5b stores the received conference ID in a storage area in S2507.

In S2504, in case of transferring the conference IDs different for each attendee in FIG. 28 to the user terminal 5a, the conference system server 1 can transfer the conference ID associating with information that identifies each user terminal 5b.

After receiving the conference ID, the user terminal 5 performs the operation after S2507 to connect to the conference system via the access point 4 just like the steps after S310 in FIG. 3. After acquiring the conference ID, the user terminal 5 is connected to the network of the conference system using wireless communication by user operation in S310.

After the user terminal 5 establishes wireless connection with the access point 4, the conference system server 1 detects that in S311 and requests the user terminal 5 to provide the authentication information for connecting to the conference system in S312. After the user terminal 5 receives the request for the authentication information, a screen for inputting connection authentication information in FIG. 29 is displayed.

As shown in FIG. 29, in the screen for inputting connection authentication information displayed on the user terminal 5 in this embodiment, an entry field for the conference ID is displayed in addition to the entry fields for the user ID and the password. On the user terminal 5, in addition to the user ID and the password, the conference ID is input by user operation. The information described above is the authentication information input based on the random numbers in this embodiment.

Figure 30:
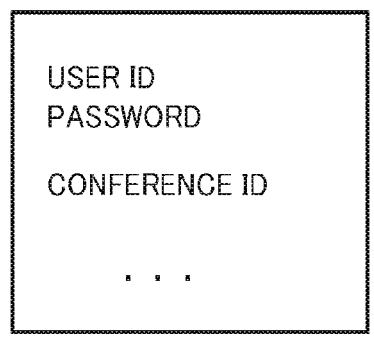
FIG. 30 is a diagram illustrating information on connection authentication as the other embodiment of the present invention.

After performing the confirming operation by inputting information on the screen for inputting connection authentication information in FIG. 29, the user terminal 5 transfers the input authentication information to the conference system server 1 in S313. FIG. 30 is a diagram illustrating the authentication information transferred by the user terminal 5 in this embodiment. As shown in FIG. 30, the user terminal 5 transfers information including "a user ID", "a password", and "a conference ID" to the conference system server 1.

After receiving the authentication information from the user terminal 5, the conference system server 1 performs the authentication operation based on the stored information as shown in FIG. 27 or FIG. 28 in S314. The operation same as Embodiment 1 is performed after S315, and the redundant description is omitted.

As described above, in this embodiment, when the invited attendee connects to the conference system via the access point 4, the authentication information in FIG. 30 issued to the invited attendees only is transferred. In addition, since the authentication information includes the conference ID generated based on the random table issued to the invited attendees only, it is possible to prevent from accessing the conference system improperly.

Figure 31:
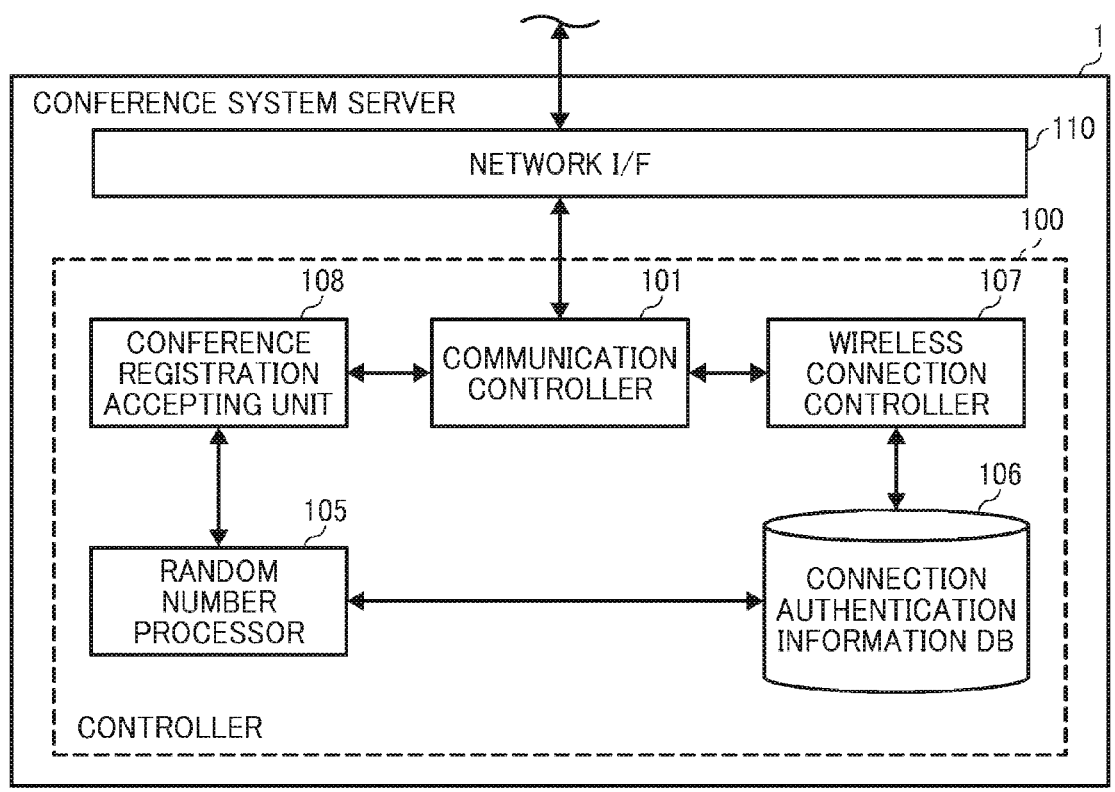
FIG. 31 is a block diagram illustrating a functional configuration of a conference system server as the other embodiment of the present invention.

Next, a functional configuration of the conference system server 1 in this embodiment is described below with reference to FIG. 31. As shown in FIG. 31, the conference system server 1 in this embodiment includes a controller 100 and a network I/F 110. The controller 100 combines software and hardware and functions as a controlling unit that controls the whole conference system server 1.

As shown in FIG. 11, the controller 100 includes a communication controller 101, a random number processor 105, a connection authentication information DB 106, a wireless connection controller 107, and a conference registration accepting unit 108. Regarding the functions that perform operations just like in Embodiment 1, the redundant description is omitted.

After accepting the request to register the conference in S2501, the conference registration accepting unit 108 registers the user ID and the password in FIG. 26. The random number processor 105 generates the random table in FIG. 7 and the information in FIGS. 27 and 28 and registers the generated information in the connection authentication information DB 106 in S2503 in FIG. 25.

Figure 32:
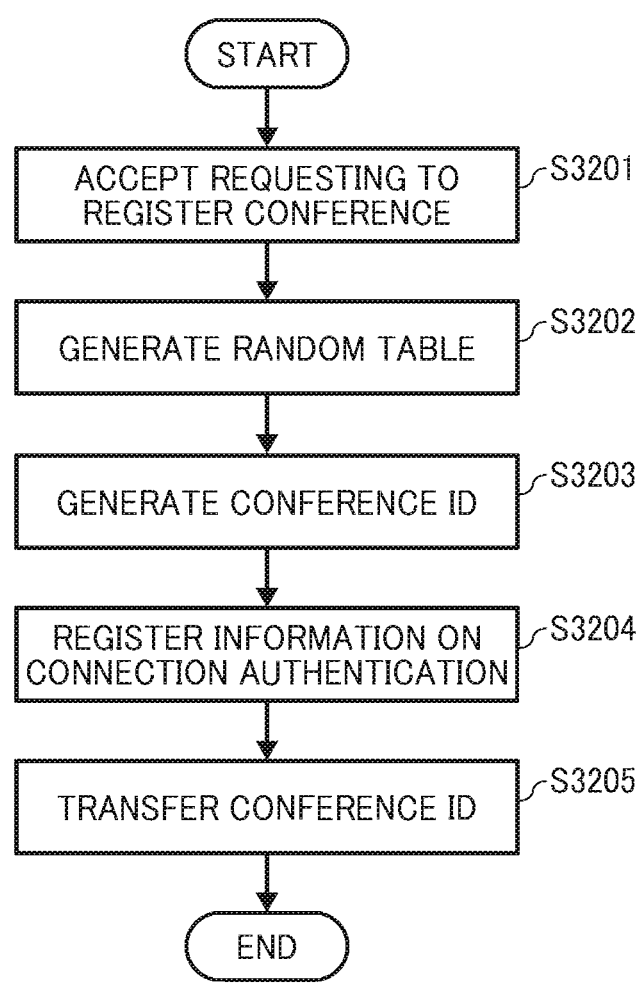
FIG. 32 is a flowchart illustrating an operation of registering a conference as the other embodiment of the present invention.

Next, an operation of registering conference in steps S2501 to S2504 is described below with reference to FIG. 32. As shown in FIG. 32, first, the conference registration accepting unit 108 acquires the request to register the conference from the user terminal 5a in S3201. After receiving the user ID and the password in FIG. 26 from the user terminal 5a, the conference registration accepting unit 108 registers the user ID and the password in the connection authentication information DB 106 and instructs the random number processor 105 to generate the random table in S3202.

The random number processor 105 generates the conference ID based on the generated random table, the user ID, and the password in S3203. After generating the conference ID, the random number processor 105 stores the information on the random table and the information in FIG. 30 as the connection authentication information in the connection authentication information DB 106 in S3204.

After the random number processor 105 registers the information in the connection authentication information DB 106, the conference registration accepting unit 108 transfers a response of confirming the registration of the conference including the conference ID to the user terminal 5a in S3205, and the process ends. After receiving the conference ID, the user terminal 5a transfers the connection authentication information including the conference ID to the attendee of the conference.

Next, after receiving the conference ID, the user terminal 5 instructs to authenticate the connection to the conference system server 1 performing the same connection authentication operation in steps S311 to S315 in FIG. 3. On the user terminal 5 in this embodiment, the screen for inputting connection authentication information in FIG. 29 is displayed to authenticate the connection. As a result, in the conference system in this embodiment, since it is required to input the conference ID generated based on the random table into the screen for inputting the information on authenticating the connection on the user terminal 5, it is possible to enhance security to connect the wireless communication.

The present invention also encompasses a non-transitory recording medium storing a program that executes a communication control method. The communication control method includes the steps of accepting confirmation of attendance according to an operation of an attendee to an information processing apparatus located at a conference room, generating a random number in case of accepting the confirmation of attendance, storing connection authentication information based on the random number in a memory, the connection authentication information being used for authenticating exchange of information with a terminal held by the attendee at the conference, transferring an output command for printing an image having the generated random number to an image forming apparatus, receiving authentication information input by the terminal based on the random number via wireless communication at the conference room, and authenticating the exchange of information with the terminal based on the connection authentication information stored in the memory.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. A communication control system, comprising:
an attendance confirmation accepting unit to accept confirmation of attendance according to an operation of an attendee to an information processing apparatus located at a conference room;
a random number processor to generate a random number in case of accepting the confirmation of attendance and store connection authentication information based on the random number in a storage medium, the connection authentication information being used for authenticating exchange of information with a terminal operated by the attendee at the conference;
a print controller to transfer an output command for printing an image having the generated random number to an image forming apparatus; and
a wireless connection controller to receive authentication information input by the terminal based on the random number via wireless communication at the conference room and authenticate the exchange of information with the terminal based on the connection authentication information stored in the storage medium.

2. The communication control system according to claim 1, wherein the attendance confirmation accepting unit prohibits the terminal operated by the attendee from exchanging information in case of receiving redundant confirmation of attendance from the same attendee.

3. The communication control system according to claim 2, wherein the attendance confirmation accepting unit prohibits the terminal operated by the attendee from exchanging information by deleting information indicating permission to connect that is generated through the authentication by the wireless connection controller.

4. The communication control system according to claim 2, wherein the attendance confirmation accepting unit prohibits the terminal operated by the attendee from exchanging information by deleting the information that the random number processor stores in the storage medium.

5. The communication control system according to claim 1, wherein the wireless connection controller allows the terminal to exchange information in case of accepting the confirmation of attendance for all attendees after authorizing the terminal to exchange information.

6. The communication control system according to claim 1, wherein the random number processor generates a plurality of randomly-generated characters arranged in matrix as the random number, and stores a part of the randomly-generated characters to be used for authorizing the terminal to exchange information as the connection authentication information.

7. The communication control system according to claim 1, further comprising an image acquisition unit to acquire an image around the information processing apparatus at a time when the operation of the attendee to the information processing apparatus to confirm the attendance is detected,
wherein the attendance confirmation accepting unit stores identification information for identifying the attendee who confirms the attendance associated with the acquired image around the information processing apparatus in the storage medium.

8. A communication control apparatus, comprising circuitry to:
accept confirmation of attendance according to an operation of an attendee to an information processing apparatus located at a conference room,
generate a random number in case of accepting the confirmation of attendance,
store connection authentication information based on the random number in a memory, the connection authentication information being used for authenticating exchange of information with a terminal held by the attendee at the conference,
transfer an output command for printing an image having the generated random number to an image forming apparatus,
receive authentication information input by the terminal based on the random number via wireless communication at the conference room, and
authenticate the exchange of information with the terminal based on the connection authentication information stored in the memory.

9. A communication control method comprising:
accepting confirmation of attendance according to an operation of an attendee to an information processing apparatus located at a conference room;
generating a random number in case of accepting the confirmation of attendance;
storing connection authentication information based on the random number in a memory, the connection authentication information being used for authenticating exchange of information with a terminal held by the attendee at the conference;
transferring an output command for printing an image having the generated random number to an image forming apparatus;
receiving authentication information input by the terminal based on the random number via wireless communication at the conference room; and
authenticating the exchange of information with the terminal based on the connection authentication information stored in the memory.

* * * * *